United States Patent
Dunberger et al.

(10) Patent No.: US 12,498,137 B2
(45) Date of Patent: Dec. 16, 2025

(54) AIR PURIFIER

(71) Applicant: BLUEAIR AB, Stockholm (SE)

(72) Inventors: Lars Henrik Dunberger, Stockholm (SE); Lars Johan Wilhelm Hadding Delin, Stockholm (SE); Jelena Radic, Stockholm (SE)

(73) Assignee: Blueair AB, Stockholm (SE)

( * ) Notice: Subject to any disclaimer, the term of this patent is extended or adjusted under 35 U.S.C. 154(b) by 317 days.

(21) Appl. No.: 17/780,250

(22) PCT Filed: Nov. 25, 2020

(86) PCT No.: PCT/EP2020/083387
§ 371 (c)(1),
(2) Date: May 26, 2022

(87) PCT Pub. No.: WO2021/105225
PCT Pub. Date: Jun. 3, 2021

(65) Prior Publication Data
US 2022/0412597 A1    Dec. 29, 2022

(30) Foreign Application Priority Data
Nov. 27, 2019   (EP) .................................... 19211688

(51) Int. Cl.
*F24F 11/72*  (2018.01)
*F24F 8/10*   (2021.01)
(Continued)

(52) U.S. Cl.
CPC ................ *F24F 11/72* (2018.01); *F24F 8/10* (2021.01); *F24F 8/30* (2021.01); *F24F 2110/30* (2018.01); *F24F 2110/64* (2018.01)

(58) Field of Classification Search
CPC ...... F24F 11/72; F24F 8/10; F24F 8/30; F24F 2110/30; F24F 2110/64; F24F 2110/50;
(Continued)

(56) References Cited

U.S. PATENT DOCUMENTS

| | | |
|---|---|---|
| 5,791,983 A | 8/1998 | Robertson |
| 2010/0021606 A1 | 1/2010 | Rauh |

(Continued)

FOREIGN PATENT DOCUMENTS

| | | |
|---|---|---|
| CN | 103234228 A | 8/2013 |
| CN | 105115049 A | 12/2015 |

(Continued)

OTHER PUBLICATIONS

Extended European Search Report and Written Opinion issued in corresponding EP Application No. 19211688.7, dated May 15, 2020, pp. 1-8.
(Continued)

*Primary Examiner* — Mohammad Ali
*Assistant Examiner* — Dhruvkumar Patel
(74) *Attorney, Agent, or Firm* — Carter, DeLuca & Farrell, LLP; George Likourezos; Bret P. Shapiro

(57) ABSTRACT

A method for indicating to a user the expected time for an air purifier to achieve a target level of pollution in a room by:
(A) acquiring the current level of pollution (CP) in said room;
(B) acquiring current air flow speed (CAFS) through said air purifier;
(C) comparing the current level of pollution (CP) with a pre-determined target level of pollution (IP);
(D) calculating the expected time (T) required to reduce current pollution (CP) to said target level of pollution (IP) at current air flow speed (CAFS);
(E) indicating said expected time (T) required to reduce current pollution to said target level of pollution at current air flow speed to a user; and
(Continued)

(F) repeating steps (A) to (E).

9 Claims, 1 Drawing Sheet

(51) Int. Cl.
  *F24F 8/30* (2021.01)
  *F24F 110/30* (2018.01)
  *F24F 110/64* (2018.01)
(58) Field of Classification Search
  CPC .. F24F 11/64; F24F 11/77; F24F 11/89; F24F 11/58; F24F 11/52; Y02B 30/70
  See application file for complete search history.

(56) References Cited

U.S. PATENT DOCUMENTS

| | | | |
|---|---|---|---|
| 2015/0306533 A1* | 10/2015 | Matlin | F24F 8/158 96/417 |
| 2015/0369503 A1 | 12/2015 | Flaherty et al. | |
| 2015/0370272 A1 | 12/2015 | Reddy et al. | |
| 2016/0121255 A1* | 5/2016 | Zhang | B01D 46/442 95/12 |
| 2016/0245543 A1* | 8/2016 | Saiki | F24F 11/75 |
| 2018/0154297 A1* | 6/2018 | Maletich | F24F 8/10 |
| 2018/0347838 A1 | 12/2018 | No | |
| 2019/0346417 A1 | 11/2019 | Benefield | |

FOREIGN PATENT DOCUMENTS

| | | | | |
|---|---|---|---|---|
| CN | 105509227 A | * | 4/2016 | |
| CN | 105744479 A | | 7/2016 | |
| EP | 1050332 A2 | | 11/2000 | |
| EP | 2900007 A1 | | 7/2015 | |
| EP | 3015780 A1 | * | 5/2016 | ........... B01D 46/442 |
| EP | 3356742 A1 | | 8/2018 | |
| JP | 2000249378 A | * | 9/2000 | |
| JP | 2009262020 A | | 11/2009 | |
| KR | 20130014852 A | * | 2/2013 | |
| KR | 20190067029 A | * | 6/2019 | |
| KR | 20190093095 A | | 8/2019 | |
| WO | WO-2016150368 A1 | * | 9/2016 | ............. F24F 11/89 |
| WO | 2017055112 A1 | | 4/2017 | |

OTHER PUBLICATIONS

International Search Report and Written Opinion issued in corresponding International Application No. PCT/EP2020/083387 dated Feb. 22, 2021, pp. 1-13.

Extended European Search Report and Written Opinion issued in corresponding EP Application No. 19211685.3, dated May 15, 2020, pp. 1-7.

International Preliminary Report on Patentability issued in corresponding International Application No. PCT/EP2020/083387 dated Mar. 2, 2022, pp. 1-11, including claim amendments pursuant to Rule 66.3.

* cited by examiner

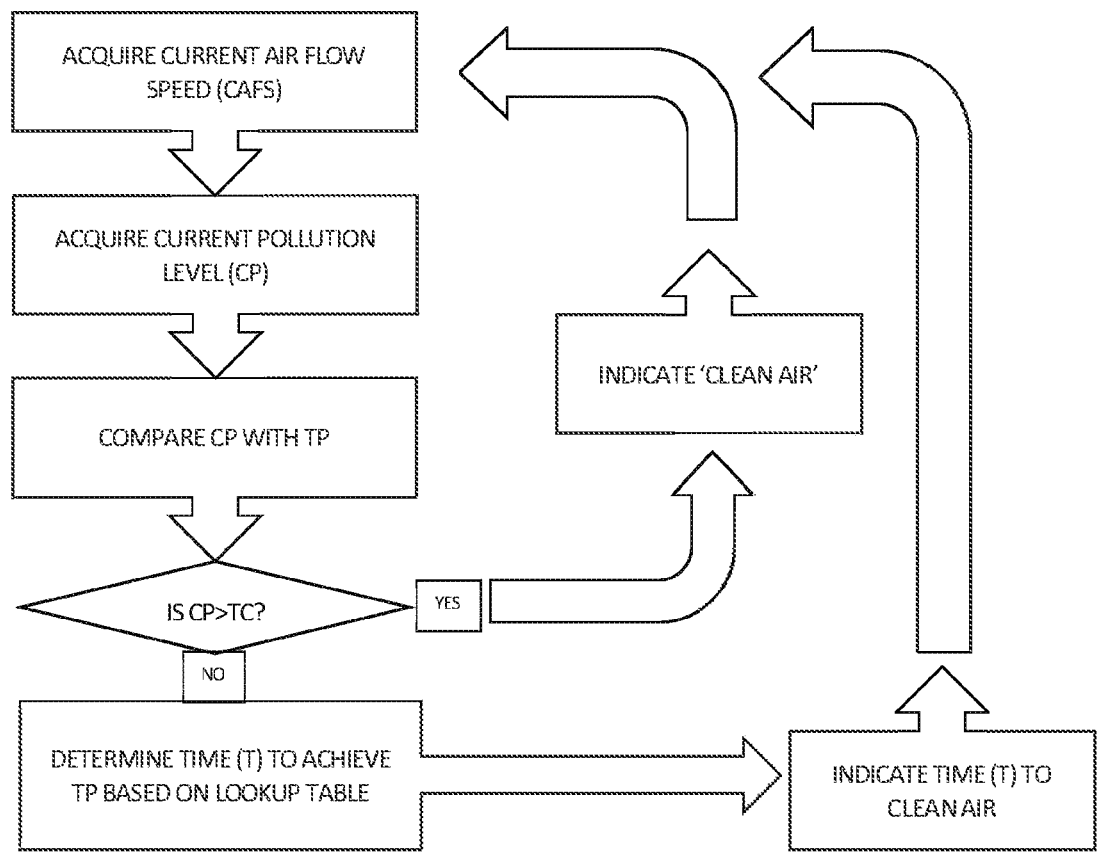

AIR PURIFIER

CROSS-REFERENCE TO RELATED APPLICATIONS

The application corresponds to PCT/EP2020/083387, filed Nov. 25, 2020, entitled "AIR PURIFIER", which claims priority to EP19211688.7, filed Nov. 27, 2019, the entirety of both are incorporated herein by reference.

The present invention relates to an improved method for determining air purifier performance.

JP-A-2009 262 020 (Panasonic) discloses an air purifier including an odour detection means for detecting odour components present in an indoor ambience, a dust detection means for detecting dust, an uncleanness-level determining means for determining the level of the uncleanness of an object to be detected based on output from the detection means an uncleanness-level memorizing means for memorizing the levels of the uncleanness in time sequence determined by the uncleanness-level determining means, and an operating time display as a display means for estimating and displaying a remaining operating time necessary for the cleaning based on the uncleanness levels in time sequence memorized in the uncleanness-level memorizing means. Thus, the amount of indoor dirt can be pre-estimated by memorizing the amount of indoor dirt generated in time sequence, and the time necessary for the cleaning based on the current air flow rate can be calculated and displayed.

EP-A-3 015 780 (Xiaomi) discloses a method for controlling purification of air, and includes: acquiring a target quality of air to be purified; determining a current quality of the air to be purified, and determining a workload for an air purifier according to the target quality and the current quality; calculating a purification duration for the air purifier to complete the workload according to a purification efficiency of the air purifier; and starting the air purifier, and displaying in real time a remaining time to complete the workload according to the purification duration.

However, the procedure disclosed in both JP-A-2009 262 020 (Panasonic) and EP-A-3 015 780 (Xiaomi) is based on past performance indicators in that the time required to achieve target clean air is based on immediate prior performance of the purifier and thus is not able to adjust should any settings, for example, fan speed, be changed. Should the fan speed change, the previous calculations of air purifier performance will cause an improper calculation to be made as it will be assumed that prior fan speed settings are still in operation for as long as those measurements are being used in the determination.

EP-A-3 356 742 (Koninklijke Philips) discloses an air purifier which uses an air purifier fitter unit and a sensor for sensing the matter to be filtered by the air purifier fitter unit. By monitoring the performance of the air purifier combined with information about the air purifier filter unit, it is possible to determine a volume of the space in which the air purifier is deployed.

Despite the prior art there remains a need for improved air purifier performance indicators, in particular air purifiers which dynamically indicate performance criteria.

Accordingly and in a first aspect there is provided a method for indicating to a user the expected time for an air purifier to achieve a target level of pollution in a room by:

(A) acquiring the current level of pollution (CP) in said room;
(B) acquiring current air flow speed (CAFS) through said air purifier;
(C) comparing the current level of pollution (CP) with a pre-determined target level of pollution (IP);
(D) calculating the expected time (T) required to reduce current pollution (CP) to said target level of pollution (IP) at current air flow speed (CAFS);
(E) indicating said expected time (T) required to reduce current pollution to said target level of pollution at current air flow speed to a user; and
(F) repeating steps (A) to (E).

An air purifier that indicates to the user how long before a safe level of ambient air quality is achieved is an attractive consumer proposition. It not only indicates to the user the relative level of pollution in the ambient surroundings but also the efficiency of the purifier in that a shorter duration to achieve determined safe level means the purifier is performing more efficiently. This also indirectly indicates to the user whether the filters need replacing as a progressively longer period indicates that the fitters may need changing. However, meaningful ways of determining this time period for achieving a target level of pollution remain unsatisfactory.

We have surprisingly found that an easy determination may be made based purely on air flow speed and current pollution levels. This determination is suitably accurate for use in domestic air purifiers and provides real-time information to a consumer as to the time taken to achieve clean air. It also forsakes the need to make calculations based on prior performance thereby allowing an assessment based purely on air purifier settings in that instant.

Further, such a method also provides feedback to the consumer that their daily regime is having an impact on the air ambient quality. For example, if the consumer believes that the external air is poor quality he or she may not be motivated to open the windows and yet it may be that internal air quality is worse than external air quality. Accordingly, if it takes less time to clean the room after the windows have been open this indicates good air quality practise to the consumer. Similarly, the use of wood burning stoves or cooking facilities may have a great impact on air quality and this will be indicated in real-time by the purifier.

A further advantage of the embodiments of the invention is that once clean ambient air is achieved the purifier may be switched off, put on stand-by or the air flow rate reduced to idle. This saves energy and removes any noise generated by the purification process. A highly desired benefit of the described method is that the consumer can easily assess the impact of air purifier settings to determine efficacy. For example, a fan speed setting of high may clean the room in 5 minutes, but reducing the speed setting to medium may increase the time to only 6 minutes. Given that fan speed setting is not only the default way of adjusting air purifier performance but is also the most directly connected to power usage, the described method employs the most appropriate parameters in combination with consumer behaviour. Consumer look for the most energy efficient way of doing things and so the method described is the most suitable performance indicator.

The target level of air quality is a pre-determinable quantity which may be input by the user as part of the set-up of the purifier. It may also be provided automatically with reference to location of the device through a GPS means, for example, in Sweden, the desired air quality may be different to the desired air quality in central London or Delhi. Further, the safe level may be a function of the pollutant of interest to the consumer. For example, the consumer may be more interested in allergens than PM2.5's, or may be more interested in smoke particles than formaldehyde levels. The consumer may of course be interested in more than one pollutant in which case the calculation to clean the air effectively may be adjusted to reflect each pollutant or the one which is the slowest to be removed from the ambient air.

Preferably, the method includes acquisition of room size to further improve the determination of time to target pollution level. Preferably, this is done by room size sensor. A room size sensor detects the size of the room in which the air purifier is operating. This improves the accuracy of the calculation from current level of pollution to the pre-determined safe level for any given air flow speed as the purifier knows how much air is passing through the particulate filter and also how much pollution there is. The room size sensor may be a standard sensor known in the art for example those using LIDAR.

In an alternative embodiment, the room size is determined by the user on set up and may be done directly on the air purifier or in an associated application run on an electronic device, such as a phone. Again, this permits greater accuracy in determining the clean air delivery rate (CADR) of the purifier since the room size can become part of the calculation.

Preferably, the pollution sensor is a particulate sensor, a gas sensor, an allergen sensor or a microbe sensor. Consumers in different geographies have different air quality concerns and so it is preferred that the embodiment of the invention has the appropriate sensing capability to match consumer need. The sensors themselves are known in the field and particulate sensors are commonly employed in air purifiers to provide information as to ambient air quality. Whatever the pollution sensor used, the sensor determines the level of pollution in the ambient environment and this value is used to determine the time taken to achieve the target clean air level of pollution.

Preferably, the means for generating an air flow is a fan. Preferably, the means for generating an air flow comprises a fan or impeller. The fan may be a bladeless fan, an axial fan but it is preferred that the fan is a radial fan.

The purifier is powered by any suitable power source including internal sources, e.g. batteries, and external power sources. The power is used to drive a motor which in turn powers at least the air flow generator and the ioniser where present.

Preferably, the air flow speed sensor is a fan speed sensor. In such an embodiment the fan speed is an indirect indicator of air flow rate in that it is not measuring air flow per se but fan speed. Whatever the means for measuring, the output is used in calculating the consequential time before the ambient air is sufficiently cleaned. More preferably, the air flow speed is merely a function of air speed setting rather than measured air flow speed. For example, a nominal value is attributed to each of the various selectable air flow speed settings and used in the calculation of time required to reach nominal clean air levels of pollution.

Once a value is determined for ambient or current pollution level (CP), target pollution level equating with clean air (TP) and the speed of the air flow (CAFS), a processor calculates the time (T) required to achieve (TP) for a given air flow speed.

The processor then indicates either than the air quality is such that the actual level of pollution is lower than the target, and so indicates 'clean air', or that clean air will be achieved in a period of time calculated using CP and CAFS.

In a preferred embodiment the pollution sensor is disposed on an air purifier and so measures the pollution in the same room as is the air purifier. However, it is also possible that the sensor is remote from the purifier. Similarly, it is preferred that the air flow sensor is disposed on the air purifier or is a sensor which acquires the air speed based on fan speed settings rather than being directly part of any active assessment of fan speed.

The sensors will also need to communicate with a receiver and this means for communication may be wired in the case of the receiver being part of the air purifier or it may be wireless in the case of the receiver being part of a portable electronic device such as a mobile phone. In a preferred embodiment the air flow speed sensor and pollution sensor are part of the air purifier and send information as to air flow speed and pollution levels to a transmitter on the purifier. The transmitter transits information on these parameters, and others if required, to a mobile device such as a mobile control panel or mobile phone which performs the necessary calculations to determines time to achieve target clean air.

Similarly, the external mobile device as described above is able to operate the purifier and so modify the time before clean air is achieved by adjusting the air speed of the purifier. In such an instance the purifier comprises an appropriate receiver for receiving such information.

It is also preferred that the purifier comprises a sound generator to generate a sound signal such as a beep once clean air is achieved.

Preferably, the air purifier used in the method comprises an ioniser. In such an instance it is also preferred that the method for determining time to target clean air includes a step of adjusting the time to clean air based on the presence or absence of an ionisation step in the air purifier.

Preferably, the ioniser comprises a corona discharge tip and a receiving electrode. When the corona discharge tip is subjected to an appropriate electric voltage (e.g. +/−2 to 10 kV) it generates an ion field between the tip and the receiving or ground electrode.

The ioniser may be disposed on the interior or the exterior of said purifier. Where the ioniser is disposed on the exterior of said device it is preferred that it is disposed at the top of the device. Locating the external ioniser at the top of the device means that domestic dust particles are ionised as they fall through the air towards the ground and are therefore more likely to aggregate as they become charged. As they become more aggregated they are more easily caught up in the air circulation pattern created by the device and so more easily filtered.

Where the ioniser is disposed in the interior of the device it is preferred that it is located before a removable particulate or gas filter in an air flow direction.

Preferably, the device comprises an interior ioniser and an exterior ioniser. The exterior ioniser facilitating aggregation of domestic dust particles and the interior ioniser facilitating capture of the aggregated dust particles by the removable particulate fitter. In both instances the ionisation permits less dense filtration media and low air speed (fan) speeds.

Preferably, the operating level of the ioniser may influence the pollution reduction rate and so it is preferred that the purifier comprises means to determine the level of ionisation and means to incorporate said ionisation operating level to the processor. It is also preferred that the processor calculates the influence of the ioniser with reference to the changes in pollution level and in this way the device calibrates itself. Certain pollutants are influenced by the effect of ionisation whereas others are not. For example, the removal of gases such as formaldehyde are not influenced at all by the functioning of the ioniser whereas particulate pollutants are directly affected.

Preferably, the air purifier used in the method comprises a removable particulate fitter. Particulate filters are commonly used to physically entrain particulates caught up in the air flow through the device.

Preferably, the removable particulate fitter is a High Efficiency Particulate Air (HEPA) filter. It is to be understood that while the fitter part of an air purifier is a vital part of its function, air purifiers are not commonly manufactured with a filter in place. They are practically always manufactured separately and most importantly often by a different commercial enterprise than of the manufacturer of the air purifier itself. It is also typical for a manufacturer of fitters to manufacture filters for different air purifier models made by different manufacturers. The particulate fitter is to be contrasted with the pre-filter or any dust filter which is present. Pre-filters and dust filters are not considered HEPA filters as they do not have the particulate capturing capability exhibited by HEPA filters. Preferably, the filter is pre-charged before application to the air purifier.

Preferably, the type of removable particulate fitter may influence the pollution reduction rate and so it is preferred that the purifier comprises means to determine the type of particulate filter and means to incorporate said information to the processor. It is also preferred that the processor calculates the influence of the type as well as age of the particulate filter with reference to the changes in pollution level and in this way the device calibrates itself. Certain pollutants are influenced by the type of particulate fitter whereas others are not. For example, the removal of gases such as formaldehyde are not influenced at all by the particulate filter whereas particulate pollutants are directly affected. Instead, the presence or nature of a gas filter may be incorporated into the process.

Preferably, the purifier comprises a pre-filter. Pre-fitters are fitters which have a low air resistance and also function as a poke guard, preventing the user from touching the volute or impeller assembly. The pre-filters are not intended to exhibit any major effect in the context of air purification. They do not have the air resistance or particle entrainment capability of dedicated particulate filters. Preferably the pre-filter is not a HEPA filter.

In an alternative embodiment the removable fitter is a gas filter. Typical gas filters include those which remove gases such as formaldehyde, carbon dioxide, carbon monoxide, nitrous oxide(s) and such like from the air flow.

In a most preferred embodiment the purifier comprises a removable particulate filter and a removable gas fitter.

Preferably, steps (A) to (E) are carried out intermittently or continuously during operation of the purifier. In one embodiment the steps are carried out at intervals of up to 1 minute, preferably up to 30 seconds, more preferably less than 5 seconds. It is also possible that the calculation of time is so regular that the user cannot perceive any interval though it is to be understood that the essence of the invention is the communication of 'time to clean air' to the user and so calculating so quickly that the time changes very quickly may be counter-intuitive. If the time to clean air is changing every 0.5 seconds the indication is unlikely to be clear.

The steps (A) to (E) are also preferably repeated should there be any change of air flow rate, for example, should the user change the speed setting of the device, e.g. fan speed. In such an instance one would expect the time to clean air to fall when the fan speed is turned up and to rise when the fan speed is decreased. Similarly, it is preferred that steps (A) to (E) are repeated if the (CP) increases by more than 1%, more preferably by more than 5% based on the previous reading. This reduces the chance of constantly changing calculations and time indications.

It is also preferable that the air flow rate is reduced to idle, or zero should the pollution level measured by the sensor (CP) equate the pre-determined safe level (TP). This is carried out by a standard feedback mechanism whereby the air flow rate is cut once (CP) reaches or falls below (IP).

In such an instance it is also preferable that the indicator makes an indication whether by visual or audible means to indicate that clean air has been achieved. For example, once the sensed air quality (CP) reaches the pre-determined level of air pollution (TP) the indicator may indicate 'YOU ARE NOW BREATHING CLEAN AIR!' and make an audible beep.

When such clean air has been achieved the air purifier device may stay in idle or stand-by mode until the air flow rate is changed actively by the user or when the ambient pollution level (CP) equals or passes back above (TP).

In one embodiment the purifier automatically activates a level of operation to maintain CP at or below TP. In another embodiment the purifier is activated when CP is above a predetermined threshold, for example, 105% (TP) or higher. It may also be activated as a function of time, for example, the purifier remains in idle until it requires 5 minutes to reduce the ambient pollution level (CP) to the pre-determined level (TP).

Preferably, steps (A) to (E) are conducted whenever the pollution level (CP) changes.

Preferably, steps (A) to (E) are conducted wherever air flow speed (CAFS) changes.

The calculation as to time (T) required to reach clean air is determined by a processor which receives information as to current air flow speed (CAFS) and current pollution level (CP).

Preferably, the processor is part of an independent electronic device such as a removable control panel (removable from the air purifier) or a portable electronic device such as an electronic tablet device or a mobile phone. Such a device will be able to receive information from the sensors which sense the current air flow speed and the current pollution level. Preferably, the device comprises a program which determines the expected time to achieve target clean air based on these two parameters and updates whenever new sensor readings are received.

A suitable program might be a simple look up table which provides expected times to clean air based on these two parameters. A preferred means for determining time to clean air involves acquiring said time (T) from a look up table which provides a time (T) for any level of current pollution (CP) versus various appropriate fan speeds (CAFS). Preferably, the look up table values are based on standard CADR tests for any given air purifier in a specified environment, for example room size. This means that the time to clean air is always current and relates to the air purifier used. By focusing purely on pollution level and fan speed the user is provided with accurate and up to date information based on industry standard calculations and not based on historic performance of the purifier which is prone to error in view of the inability to include air flow in the determination. Target clean air (CT) is a nominal level determined by the user or by the processor. For example, a user may input a target level whether based on scientifically articulated levels, for example X ppm PM2.5 or Y ppm formaldehyde, for as a roughly indexed category, e.g. 'very clean', 'quite clean', moderately clean', etc. and an appropriate level is attributed to the processor in each case. In one embodiment the level for CT is determined by the look up tables. For example, there is a look up table assessing fan speed and current pollution level for a variety of target pollution levels.

Embodiments of the invention will now be described with reference to the following non-limiting figures in which:

FIG. 1 is a flow diagram illustrating the process for making the estimated time to clean air calculation and indicate the time required to clean the air.

In detail, FIG. 1 shows a process whereby the air flow speed (CAFS) is determined by measurement or by reference to an attributed value based on air flow speed setting; the ambient pollution level (CP) is measured by a sensor; (CP) is compared with a nominal pre-determined level (TP) of pollution equating with 'clean air' or the target level of air pollution; if (CP) is equal to or below (TP) then the indicator indicates that the air is clean; if (CP) is above (TP) then the time taken (T) to achieve clean air (TP) based on a calculation with (CAFS) and (TP); the T is indicated by the indicator. The process returns to the start in order to re-calculate though it is likely there is a time delay before doing this.

The invention claimed is:

1. A method for indicating to a user the expected time for an air purifier to achieve a target level of pollution in a room, the method comprising:
    acquiring a current level of pollution (CP) in said room;
    acquiring current air flow speed (CAFS) through said air purifier;
    comparing the current level of pollution (CP) with a pre-determined target level of pollution (TP);
    calculating the expected time (T) required to reduce current pollution (CP) to said target level of pollution (TP) at current air flow speed (CAFS), wherein the expected time (T) is calculated based solely on current air flow speed (CAFS) and current pollution (CP) and not on historical data or prior performance of the air purifier;
    indicating said expected time (T) required to reduce current pollution to said target level of pollution at current air flow speed to a user; and
    reducing a current airflow rate of the air purifier to idle or zero when the current level of pollution (CP) reaches said target level of pollution (TP) wherein the method is conducted when the pollution level (CP) changes by more than 1% of a preceding level, or when the said current air flow speed (CAFS) is changed by a user.

2. The method of claim 1, further including acquiring a size of the room and adjusting T based on the acquired size of the room.

3. The method according to claim 2 comprising inputting the size of the room manually.

4. The method according to claim 1, wherein acquiring the current level of pollution (CP) in the room is executed by a particulate sensor.

5. The method according to claim 1, wherein acquiring the current level of pollution (CP) in the room is executed by is a gas sensor.

6. The method according to claim 1, wherein acquiring the current level of pollution (CP) in the room is executed by an allergen sensor.

7. The method according to claim 1, wherein acquiring the current level of pollution (CP) in the room is executed by a microbe sensor.

8. The method according to claim 1, where acquiring current air flow speed (CAFS) is executed by a fan speed sensor.

9. The method according to claim 1, further comprising determining whether an ioniser is functioning and adjusting the time required to achieve target level of pollution accordingly.

\* \* \* \* \*